US012204288B2

(12) United States Patent
Hata

(10) Patent No.: US 12,204,288 B2
(45) Date of Patent: Jan. 21, 2025

(54) CONNECTOR, BAND AND TIMEPIECE

(71) Applicant: CASIO COMPUTER CO., LTD., Tokyo (JP)

(72) Inventor: Ryosuke Hata, Tachikawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 533 days.

(21) Appl. No.: 17/531,191

(22) Filed: Nov. 19, 2021

(65) Prior Publication Data

US 2022/0163928 A1 May 26, 2022

(30) Foreign Application Priority Data

Nov. 20, 2020 (JP) ................................ 2020-193134

(51) Int. Cl.

| | |
|---|---|
| ***G04G 17/06*** | (2006.01) |
| ***A44C 5/14*** | (2006.01) |
| ***G04B 37/14*** | (2006.01) |
| ***H01R 13/639*** | (2006.01) |

(52) U.S. Cl.

CPC ............ *G04G 17/06* (2013.01); *A44C 5/147* (2013.01); *G04B 37/1493* (2013.01); *H01R 13/639* (2013.01)

(58) Field of Classification Search

CPC .. G04G 17/06; H01R 13/639; G04B 37/1493; A44C 5/147

See application file for complete search history.

(56) References Cited

U.S. PATENT DOCUMENTS 2,870,511 A * 1/1959 Sand ........................ A44C 5/14 24/265 B
3,824,783 A * 7/1974 Nadeau .............. G04B 37/1493 968/360
3,939,534 A * 2/1976 Hayes ...................... A44C 5/14 24/265 B
4,564,308 A * 1/1986 Ikegami ............. G04B 37/1493 968/360
5,403,374 A * 4/1995 Kitagawa ................ B22F 3/225 419/33

(Continued)

FOREIGN PATENT DOCUMENTS

CN 207855186 U 9/2018
JP S4034707 Y 12/1965

(Continued)

OTHER PUBLICATIONS

Machine translation of Masuda (JP 2006271812), original provided by applicant (Year: 2024).*

(Continued)

*Primary Examiner* — Edwin A. Leon
*Assistant Examiner* — Sean R Brannon
(74) *Attorney, Agent, or Firm* — Scully, Scott, Murphy & Presser, P.C.

(57) ABSTRACT

A connector including an attachment member which has an attachment hole and is provided on one of a connection object and a connection target, and a connection member which includes a slide member that has a lever and is slidable in a cylindrical member inserted into the attachment hole, and is attached to an other one of the connection object and the connection target by the slide member protruding from an end of the cylindrical member, in which the attachment member has a slit hole which is formed extending from one end of the attachment hole to an other end of the attachment hole and in which the lever is slidable.

11 Claims, 9 Drawing Sheets

(56) References Cited

U.S. PATENT DOCUMENTS

| | | | | |
|---|---|---|---|---|
| 5,483,505 | A * | 1/1996 | Cartier | G04B 37/1493 368/282 |
| 8,240,011 | B2 * | 8/2012 | Chevrolet | G04B 37/1493 24/265 B |
| 9,092,012 | B2 * | 7/2015 | Dornhege | G04B 37/1493 |
| 10,503,121 | B2 | 12/2019 | Matsunaga et al. | |
| 2014/0250637 | A1 * | 9/2014 | Stotz | G04B 37/1493 24/265 B |
| 2017/0097610 | A1 | 4/2017 | Matsunaga et al. | |
| 2019/0324403 | A1 * | 10/2019 | Maire | A44C 5/14 |
| 2020/0405016 | A1 * | 12/2020 | Pesenti | A44C 5/147 |

FOREIGN PATENT DOCUMENTS

| | | | |
|---|---|---|---|
| JP | S57-052817 | U | 3/1982 |
| JP | S61172527 | U | 10/1986 |
| JP | H03122711 | U | 12/1991 |
| JP | H11-146804 | A | 6/1999 |
| JP | 2006-271812 | A | 10/2006 |
| JP | 4754249 | B2 | 8/2011 |
| JP | 2017073429 | A | 4/2017 |
| JP | 2020-168218 | A | 10/2020 |

OTHER PUBLICATIONS

Machine translation of Sugano (JP H11146804), original provided by applicant (Year: 2024).*

Notice of Reasons for Refusal dated Dec. 22, 2022 received in Japanese Patent Application No. JP 2020-193134.

1 Notice of First Office Action dated Mar. 17, 2023 received in Chinese Patent Application No. CN 202111368361.8.

Notice of Reasons for Refusal dated Aug. 6, 2024 received in Japanese Patent Application No. 2023-078570.

* cited by examiner

CONNECTOR, BAND AND TIMEPIECE

CROSS-REFERENCE TO RELATED APPLICATION

This application is based upon and claims the benefit of priority from the prior Japanese Patent Application No. 2020-193134, filed Nov. 20, 2020, the entire contents of which are incorporated herein by reference.

BACKGROUND OF THE INVENTION

1. Field of the Invention

The technical field relates to a connector that is used for wristwatches, clothes, briefcases, handbags, or the like, a band having the connector, and a timepiece having the band.

2. Description of the Related Art

A watch band is known which has a structure where an attachment hole is formed in an attachment piece attached to an end of a band main body, a connection member called a spring rod is inserted into the attachment hole, and the attachment piece is attached to a wristwatch case by the connection member, as described in Japanese Patent Application Laid-Open (Kokai) Publication No. 11-146804.

SUMMARY OF THE INVENTION

One embodiment is a connector comprising: an attachment member which has an attachment hole and is provided on one of a connection object and a connection target; and a connection member which (i) includes a slide member that has a lever and is slidable in a cylindrical member inserted into the attachment hole, and (ii) is attached to an other one of the connection object and the connection target by the slide member protruding from an end of the cylindrical member, wherein the attachment member has a slit hole which is formed extending from one end of the attachment hole to an other end of the attachment hole and in which the lever is slidable.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 5A and FIG. 5B are diagrams showing a main portion of a watch band of the wristwatch shown in FIG. 1, of which FIG. 5A is an enlarged perspective view and FIG. 5B is an enlarged side view;

FIG. 6A and FIG. 6B are diagrams showing the main portion of the watch band of FIG. 5A with lever sections of a connection member being rotated toward the back surface side of the watch band, of which FIG. 6A is an enlarged front view and FIG. 6B is an enlarged side view;

FIG. 8A and FIG. 8B are diagrams showing the connection member of FIG. 6A, of which FIG. 8A is an enlarged perspective view of the connection member and FIG. 8B is an enlarged cross-sectional view of the connection member taken along the B-B arrow view in FIG. 8A.

DETAILED DESCRIPTION OF THE PREFERRED EMBODIMENTS

An embodiment where the present invention has been applied in a wristwatch will hereinafter be descried with reference to FIG. 1 to FIG. 8B.

Figure 1:
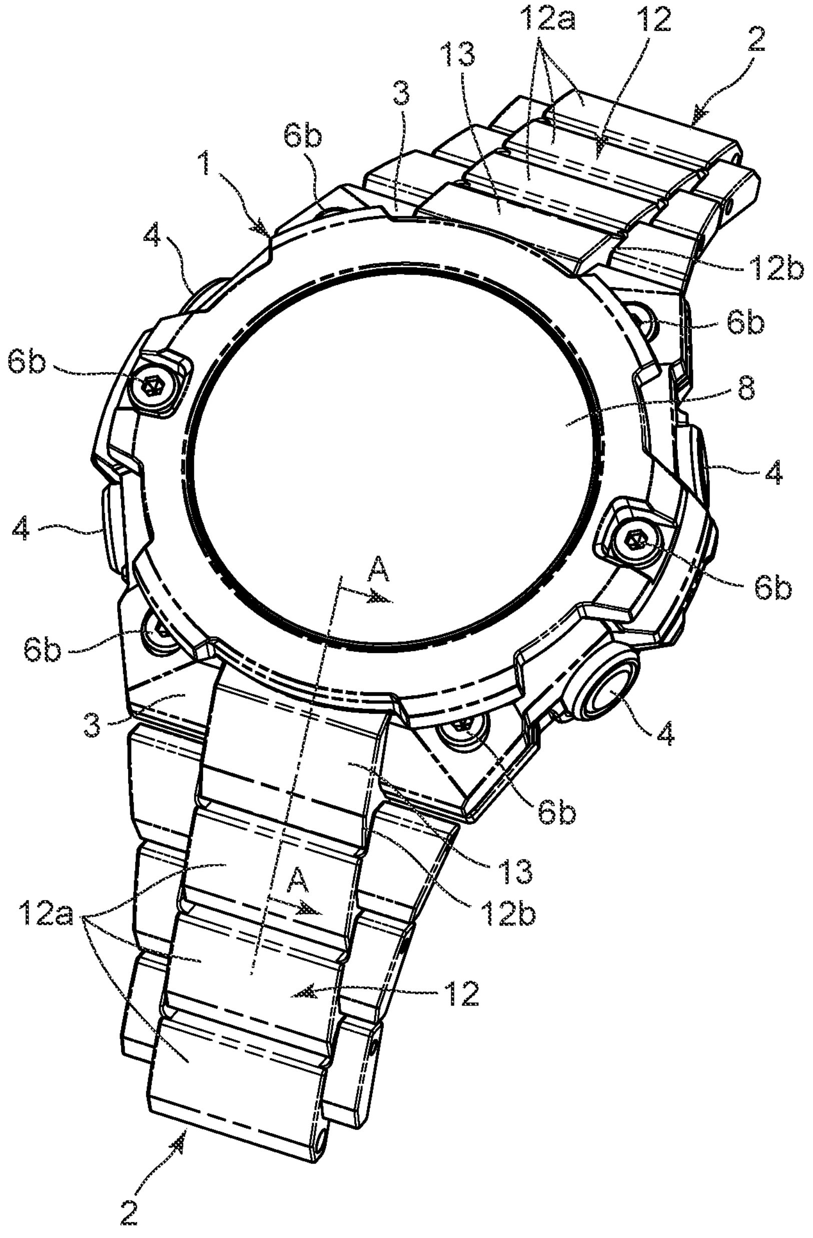
FIG. 1 is an enlarged perspective view showing an embodiment of a wristwatch.
Figure 2:
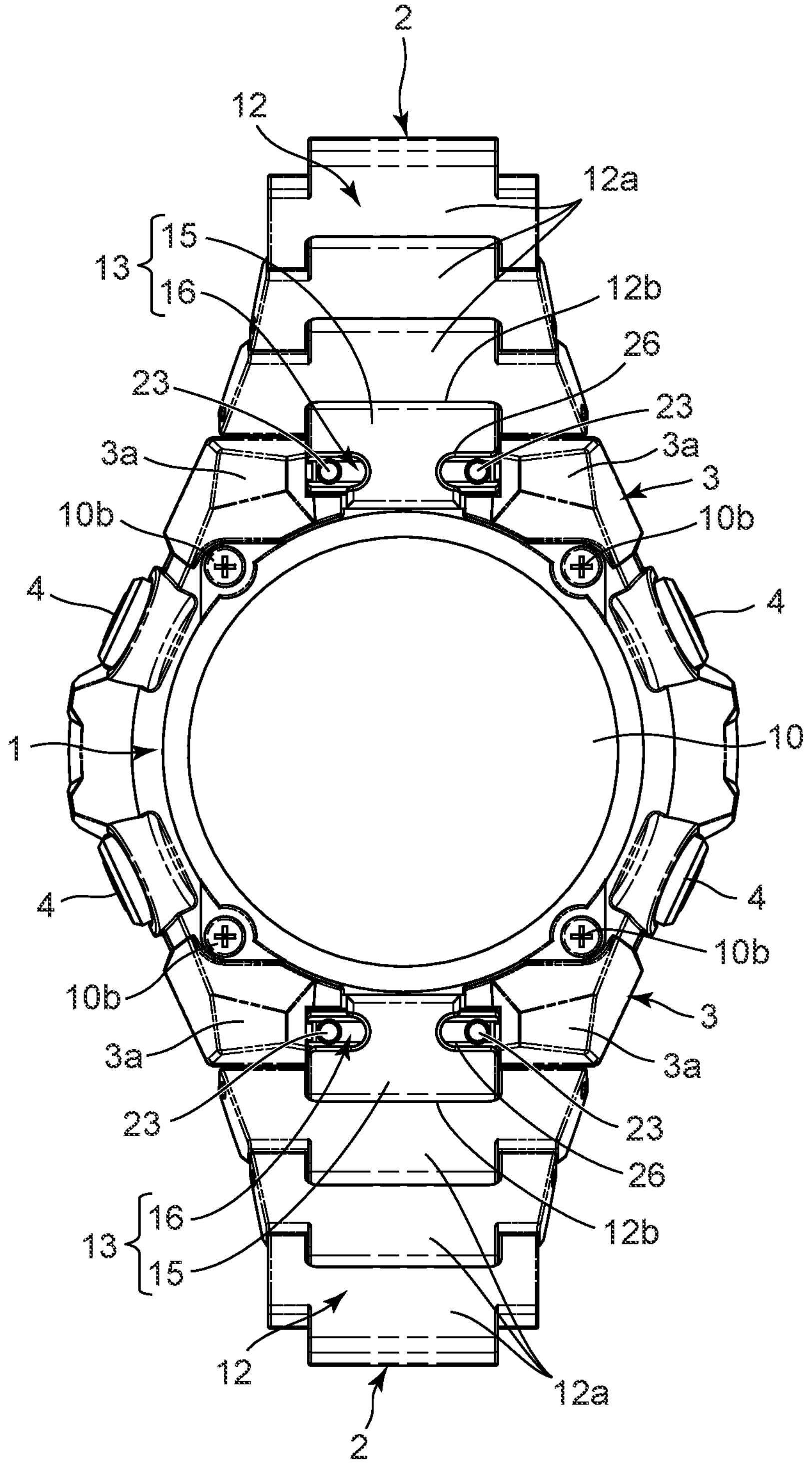
FIG. 2 is an enlarged rear view of the wristwatch shown in FIG. 1.

This wristwatch has a wristwatch case 1 that is a connection target, as shown in FIG. 1 and FIG. 2. On the twelve o'clock side and six o'clock side of the wristwatch case 1, band attachment sections 3 to which watch bands 2 are attached are provided. Also, on the two o'clock side, four o'clock side, eight o'clock side and ten o'clock side of the wristwatch case 1, push button switches 4 are provided, respectively.

Figure 3:
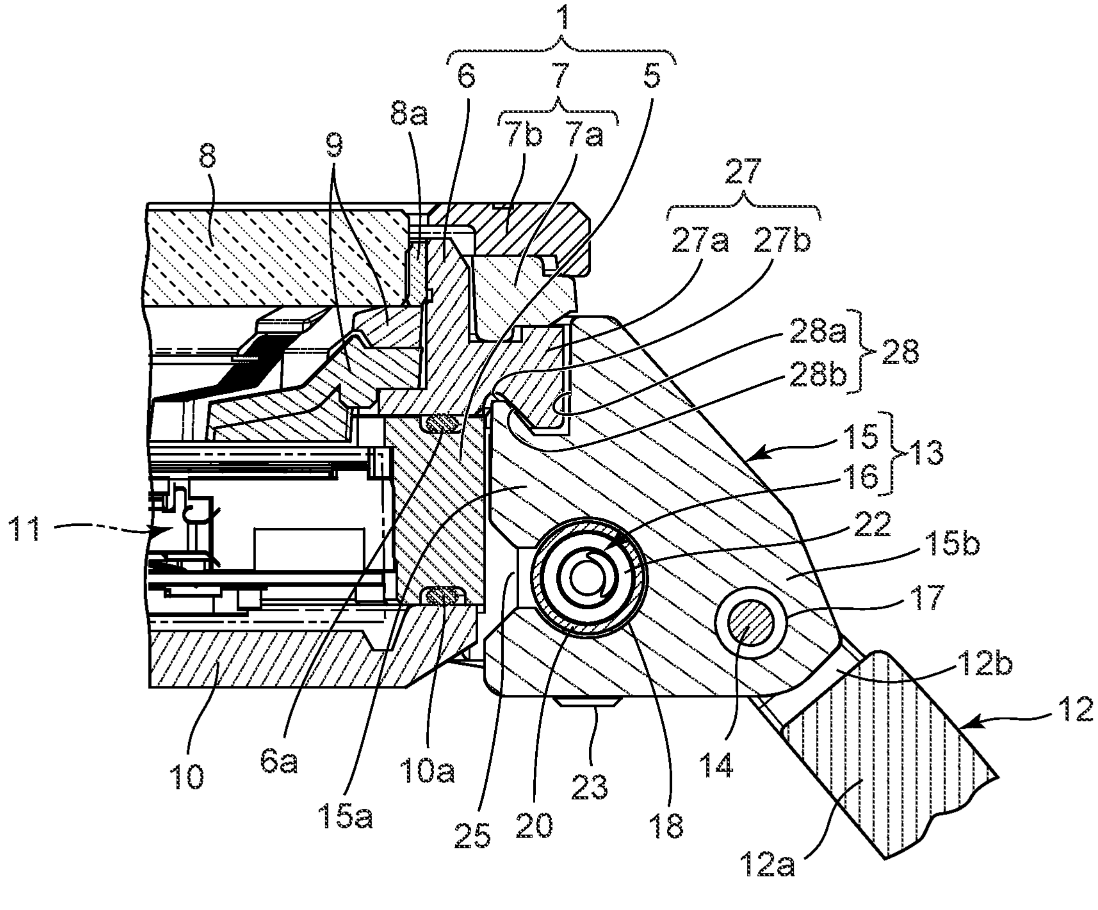
FIG. 3 is enlarged cross-sectional view showing a main portion of the wristwatch taken along the A-A arrow view in FIG. 1.

In this embodiment, the wristwatch case 1 includes a lower case 5, an upper case 6, and an exterior case 7, as shown in FIG. 3. The lower case 5 is formed of metal or a hard synthetic resin having high rigidity which is acquired by, for example, glass fiber or carbon fiber being mixed into polyamide resin. On the other hand, the upper case 6 is formed of metal such as stainless steel or titanium alloy.

This upper case 6 is structured to be arranged on the upper part of the lower case 5 via a waterproof ring 6*a*, as shown in FIG. 3. The exterior case 7 includes a first decorative case 7*a* which has a substantially ring shape and is attached to an upper outer circumferential portion of the upper case 6, and a second decorative case 7*b* which has a substantially ring shape and is attached to the upper part of the first decorative case 7*a* while covering the upper part of the upper case 6.

As a result, the wristwatch case 1 is structured such that the upper case 6 is arranged on the upper part of the lower case 5 via the waterproof ring 6*a*, the first decorative case 7*a* of the exterior case 7 is arranged on the upper outer circumferential portion of the upper case 6, the second decorative case 7*b* of the exterior case 7 is arranged on the upper part of the first decorative case 7*a*, and the lower case 5, the upper case 6, and the exterior case 7 in this state are attached to one another by a plurality of screws 6*b*, as shown in FIG. 3.

In the upper opening of the wristwatch case 1, that is, in the upper opening of the upper case 6, a watch glass 8 is attached via a packing 8*a*, as shown in FIG. 1 to FIG. 3. In an inner area of the wristwatch case 1 under the watch glass 8, that is, in an inner area of the upper case 6 under the watch glass 8, parting members 9 are provided. Also, on the lower part of the wristwatch case 1, that is, on the lower part of the lower case 5, a back cover 10 is attached by a plurality of screws 10*b* via a waterproof ring 10*a*.

Inside the wristwatch case 1, or more specifically, inside the lower case 5, a timepiece module 11 is provided, as shown in FIG. 3. Although not shown in the drawing, this timepiece module 11 has various components necessary for timepiece functions, such as a timepiece movement for driving pointers, a display panel for electro-optically displaying information including time information, and a circuit section for electrically driving these sections.

Figure 4:
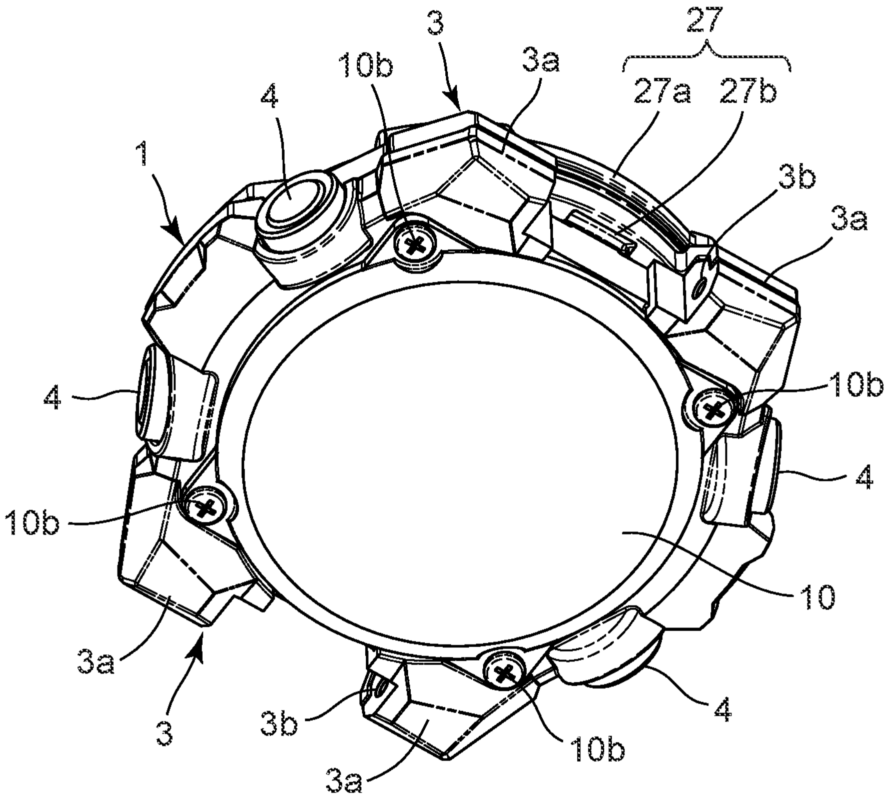
FIG. 4 is an enlarged perspective view showing the back surface side of a wristwatch case shown in FIG. 1.
Figure 5A:
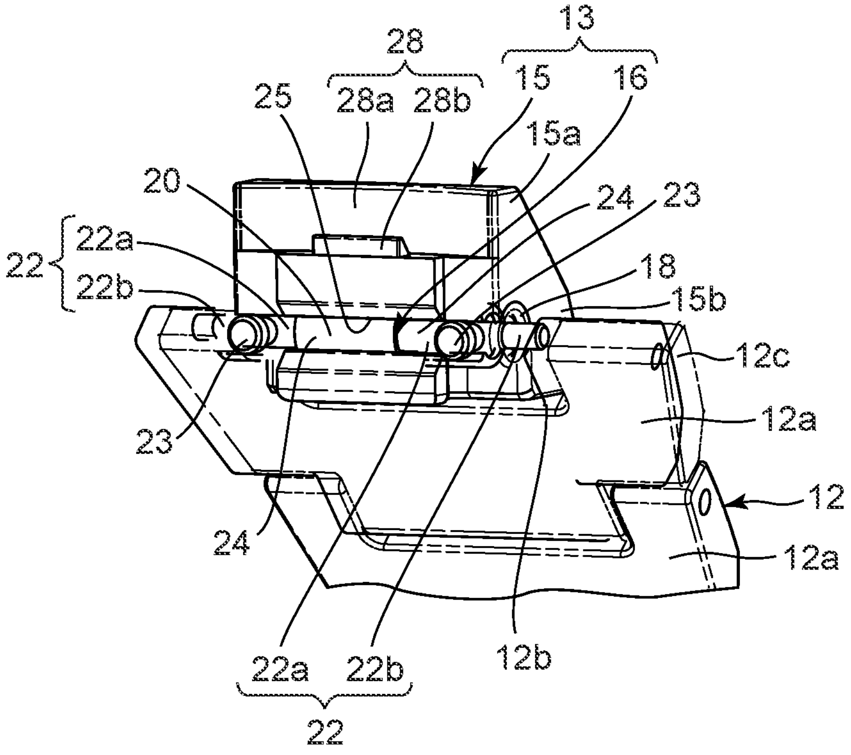
Figure 5B:
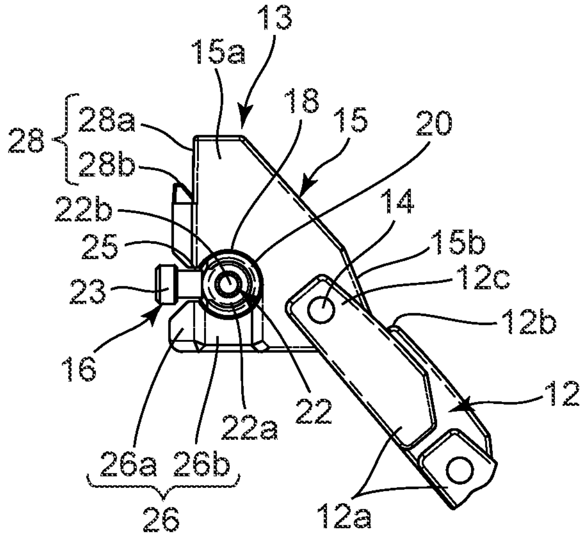
Figure 6A:
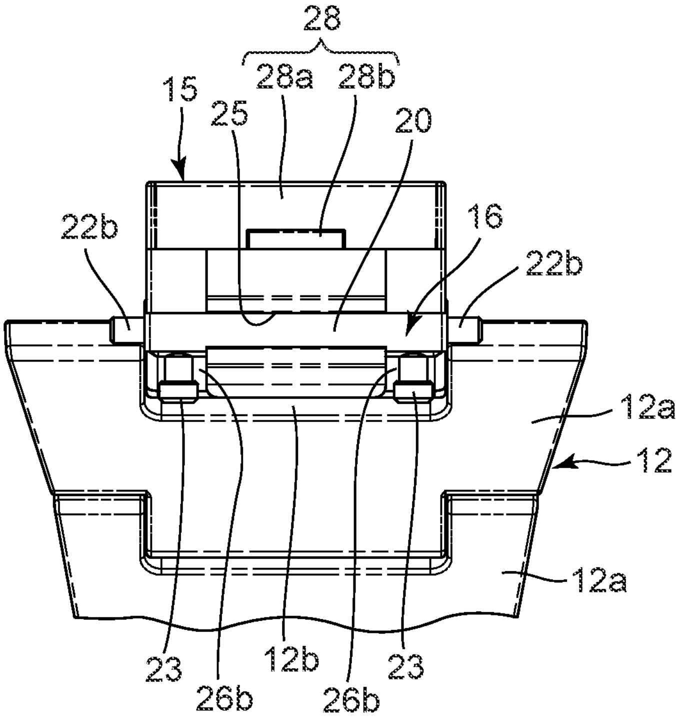
Figure 6B:
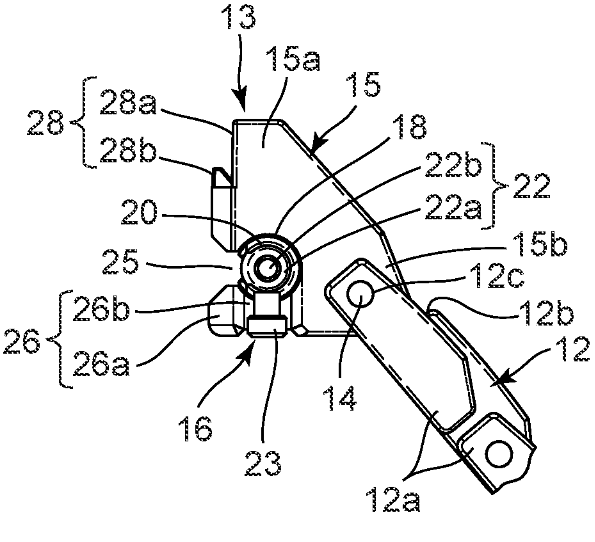
Figure 7:
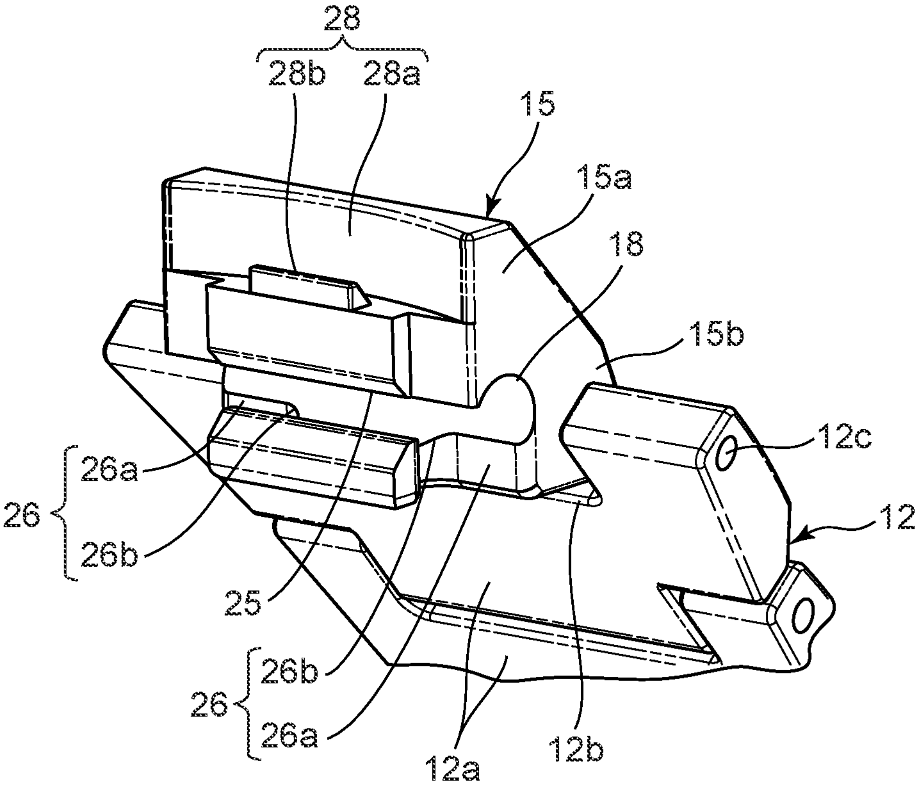
FIG. 7 is an enlarged perspective view showing the main portion of the watch band of FIG. 5A, in which the connection member has been detached from an attachment piece.

The watch bands 2 are structured such that band main bodies 12 which are connection objects are attached to the band attachment sections 3 of the wristwatch case 1 which are connection targets by connectors 13, as shown in FIG. 1 to FIG. 3. In this embodiment, the band attachment sections 3 of the wristwatch case 1 include pairs of attachment projection sections 3*a* provided on outer circumferential portions of the lower case 5 and the upper case 6 on the twelve o'clock side and the six o'clock side. In each pair of attachment projection sections 3*a*, pin connection holes 3*b* are coaxially provided, as shown in FIG. 4.

Each band main body 12 is constituted by a plurality of metal band pieces 12*a* being sequentially connected to one another, as shown in FIG. 1 and FIG. 2. Note that these band pieces 12*a* may be made using synthetic resin. Also, each connector 13 includes an attachment piece 15 which is an attachment member and attached to an end of the corresponding band main body 12 by a pin component 14, and a connection member 16 which is attached to the attachment piece 15 so as to attach the attachment piece 15 to the corresponding band attachment section 3 of the wristwatch case 1, as shown in FIG. 3, and FIG. 5A to FIG. 6B.

Each attachment piece 15 has one end portion 15*a* which is arranged between the pair of attachment projection sections 3*a* of the corresponding band attachment section 3 of the wristwatch case 1 and opposes the outer circumferential surface of the wristwatch case 1, and the other end portion 15*b* which is arranged in a recess section 12*b* in a band piece 12*a* at an end of the corresponding band main body 12 so as to be attached to this band piece 12*a* at the end of the band main body 12, as shown in FIG. 3, and FIG. 5A to FIG. 7.

More specifically, this attachment piece 15 is formed such that the thickness (height) of the one end portion 15*a* is substantially equal to the thickness of the wristwatch case 1, that is, the vertical length (height) of the outer circumferential surface of the wristwatch case 1, and the thickness of the other end portion 15*b* is substantially equal to the thickness of the band main body 12, whereby the other end portion 15*b* is thinner than the one end portion 15*a*, as shown in FIG. 3, and FIG. 5A to FIG. 7. As a result, the attachment piece 15 has an inclined surface such that its height gradually decreases from the upper part of the one end portion 15*a* toward the upper part of the other end portion 15*b*, and thereby has a substantially right triangular prism shape as a whole.

In this embodiment, in the other end portion 15*b* of the attachment piece 15, a pin attachment hole 17 into which the corresponding pin component 14 is inserted is provided penetrating in a transverse direction perpendicular to a longitudinal direction of the band main body 12, as shown in FIG. 3, and FIG. 5A to FIG. 7. The pin component 14 is formed such that its axial length is equal to the transverse length of the band piece 12*a* at the end of the band main body 12.

As a result, the other end portion 15*b* of the attachment piece 15 is structured such that, when arranged in the recess section 12*b* in the band piece 12*a* at the end of the band main body 12, this other end portion 15*b* coaxially corresponds to pin insertion holes 12*c* provided in side portions of the recess section 12*b* of the band piece 12*a* in the transverse direction of the band main body 12, as shown in FIG. 3, and FIG. 5A to FIG. 7.

Also, the other end portion 15*b* of the attachment piece 15 is structured such that, when arranged in the recess section 12*b* in the band piece 12*a* at the end of the band main body 12, this other end portion 15*b* is attached to the band piece 12*a* at the end of the band main body 12 by the pin component 14 being inserted into the pin attachment hole 17 in the other end portion 15*b* of the attachment piece 15 through one of the pin insertion holes 12*c* in the side portions of the recess section 12*b* of the band piece 12*a* in the transverse direction of the band main body 12 and being inserted into the other one of the pin insertion holes 12*c* in the side portions of the recess section 12*b* of the band piece 12*a*, as shown in FIG. 3, and FIG. 5A to FIG. 7.

On the other hand, in the one end portion 15*a* of the attachment piece 15, an attachment hole 18 into which a pipe section 20 of the corresponding connection member 16 is inserted is provided penetrating in the transverse direction of the band main body 12, as shown in FIG. 3, and FIG. 5A to FIG. 7. This attachment hole 18 is formed to coaxially correspond to the pin connection holes 3*b* of the pair of attachment projection sections 3*a* when the one end portion 15*a* of the attachment piece 15 is arranged between the pair of attachment projection sections 3*a* of the band attachment section 3 of the wristwatch case 1.

The connection member 16 is a spring rod for attaching the attachment piece 15 to the band attachment section 3 of the wristwatch case 1, and includes the pipe section 20 which is a cylindrical section, a spring member 21 arranged in the pipe section 20, a pair of slide sections 22 slidably arranged in end portions of the pipe section 20, and a pair of lever sections 23 for sliding the pair of slide sections 22 in the axial directions of the pipe section 20, as shown in FIG. 3, FIG. 6A, FIG. 6B, FIG. 8A, and FIG. 8B.

As a result, the connection member 16 is structured such that, by the spring force of the spring member 21, the pair of slide sections 22 is pressed toward the outside of the pipe section 20 through its ends, as shown in FIG. 3, FIG. 6A, FIG. 6B, FIG. 8A, and FIG. 8B. In this embodiment, the pipe section 20 is formed such that its outer diameter is equal to the inner diameter of the attachment hole 18 of the attachment piece 15, and its axial length is equal to or slightly shorter than the axial length of the attachment hole 18.

Figure 8A:
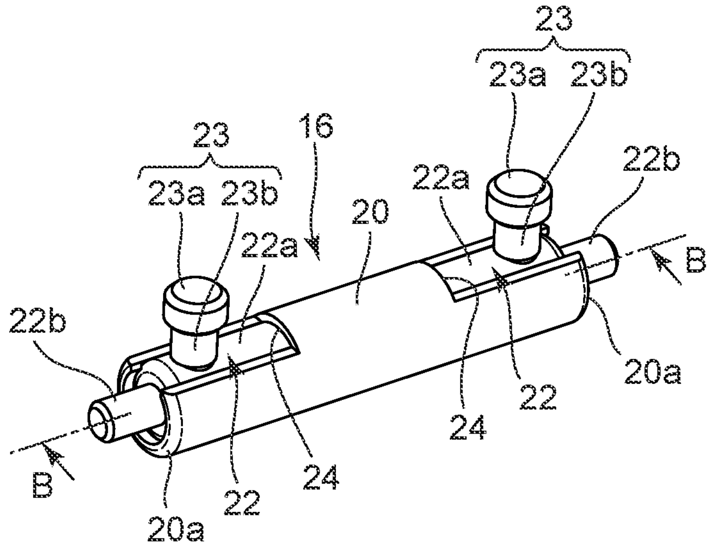
Figure 8B:
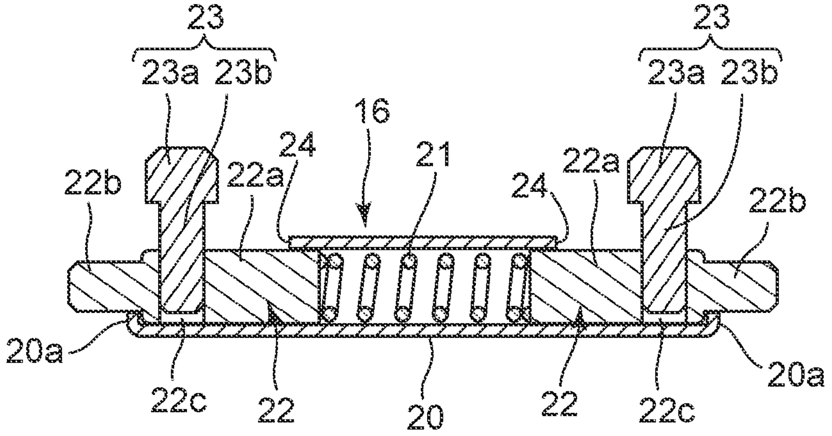

The spring member 21 is a coil spring whose outer diameter is slightly shorter than the inner diameter of the pipe section 20, as shown in FIG. 8B. This spring member 21 is formed such that its length in expansion and contraction directions in its free state, that is, its axial length is longer than the length between the pair of slide sections 22 pressed outward and moved to the end portions of the pipe section 20, that is, the length between the inner ends of these slide sections 22. As a result, this spring member 21 is structured such that its ends resiliently come in contact with the inner ends of the pair of slide sections 22 and force these slide sections 22 toward the outside of the pipe section 20 from the inside thereof.

Each of the pair of slide sections 22 includes a slide main body 22*a* whose diameter is large and a projection section 22*b* whose diameter is small, as shown in FIG. 8A and FIG. 8B. The slide main body 22*a*, which is slidably arranged in the pipe section 20, is formed such that its outer diameter is equal to or slightly shorter than the inner diameter of the pipe section 20 and its axial length is substantially one-third of the axial length of the pipe section 20.

These slide main bodies 22*a* are structured such that, when they are arranged in side portions of the pipe section 20 and forced outward by the spring member 21, the rims of their outer ends come in contact with stopper sections 20*a* provided on the rims of the ends of the pipe section 20 by a swaging process, and thereby are not slipped out from the pipe section 20, as shown in FIG. 8B.

Each projection section 22*b* of the pair of slide sections 22 is integrally formed on the outer end of the corresponding slide main body 22*a* while coaxially corresponding thereto, as shown in FIG. 8A and FIG. 8B. These projection sections 22*b* are structured to retractably protrude outward from the ends of the pipe section 20 without coming in contact with the stopper sections 20*a* on the ends of the pipe section 20.

More specifically, the projection sections 22*b* are formed such that their outer diameters are shorter than the outer diameters of the slide main bodies 22*a* and the inner diameters of the stopper sections 20*a* on the ends of the pipe section 20, and substantially equal to the inner diameters of the pin connection holes 3*b* in the pair of attachment projection sections 3*a* of the band attachment section 3 of the wristwatch case 1 in FIG. 4, as shown in FIG. 8A and FIG. 8B. Also, these projection sections 22*b* are formed such that their axial lengths are substantially one-third of the lengths of the slide main bodies 22*a* and substantially equal to the axial lengths of the pin connection holes 3*b* in the pair of attachment projection sections 3*a*.

As a result, these projection sections 22*b* are structured to be pressed outside the pipe section 20 and inserted into the pin connection holes 3*b* in the pair of attachment projection sections 3*a* of the band attachment section 3 of the wristwatch case 1 in FIG. 4 when the slide main bodies 22*a* are pressed toward the outside of the pipe section 20 by the spring force of the spring member 21, as shown in FIG. 8A and FIG. 8B. In addition, these projection sections 22*b* are structured such that, when pressed against the spring force of the spring member 21, they are shifted out of the pin connection holes 3*b* of the pair of attachment projection sections 3*a* and moved into the pipe section 20.

To the slide main bodies 22*a* of the pair of slide sections 22, the lever sections 23 are attached, as shown in FIG. 8A and FIG. 8B. These lever sections 23 are used to slide the slide main bodies 22*a* of the pair of slide sections 22 in the pipe section 20 in the axial directions.

More specifically, each lever section 23 includes a head section 23*a* having a substantially columnar shape and a shaft section 23*b* having a round bar shape, and these lever sections 23 are structured such that, by welding or screws, the shaft sections 23*b* are attached to shaft attachment holes 22*c* in the slide main bodies 22*a* through opening sections 24 provided in side portions of the pipe section 20, as shown in FIG. 8A and FIG. 8B.

In this embodiment, the opening sections 24 formed in the side portions of the pipe section 20 are long holes extending from the rims of the ends of the pipe section 20 along the axial directions of the pipe section 20, as shown in FIG. 8A and FIG. 8B. That is, each opening section 24 is formed such that its length in the axial directions of the pipe section 20 is slightly shorter than the axial length of the slide main body 22*a* of the corresponding slide section 22, and its length in the radial directions perpendicular to the axial directions of the pipe section 20 is equal to or slightly longer than the outer diameter of the shaft section 23*b* of the corresponding lever section 23.

Also, these opening sections 24 are formed such that, when the projection sections 22*b* of the pair of slide sections 22 are pressed to the outside of the pipe section 20 by the spring force of the spring member 21 and the rims of the outer ends of the pair of slide main bodies 22*a* come in contact with the stopper sections 20*a* provided on the ends of the pipe section 20, the shaft sections 23*b* of the pair of lever sections 23 are positioned near the outer ends of the pipe section 20, as shown in FIG. 8A and FIG. 8B.

Moreover, these opening sections 24 are formed such that, when the projection sections 22*b* of the pair of slide sections 22 are pressed into the pipe section 20 against the spring force of the spring member 21, the shaft sections 23*b* of the pair of lever sections 23 are positioned near or in contact with the inner ends of the opening sections 24 in the middle of the pipe section 20, as shown in FIG. 8A and FIG. 8B.

In the one end portion 15*a* of the attachment piece 15 of the connector 13, a slit hole 25 is formed into which the pair of lever sections 23 of the connection member 16 is slidably inserted when the pipe section 20 is inserted into the attachment hole 18 of the attachment piece 15, and this slit hole 25 is located along the entire length of the attachment hole 18 from one end of the attachment hole 18 to the other end, as shown in FIG. 3, and FIG. 5A to FIG. 7.

More specifically, this slit hole 25 is formed such that its length in the width directions perpendicular to the axial directions of the attachment hole 18 is shorter than the inner diameter of the attachment hole 18 and substantially equal to or slightly longer than the outer diameter of each shaft section 23*b* of the pair of lever sections 23 of the connection member 16, as shown in FIG. 3, and FIG. 5A to FIG. 7. As a result, the pipe section 20 is structured such that, when arranged in the attachment hole 18, this pipe section 20 is not slipped out from the attachment hole 18 through the slit hole 25 toward a direction perpendicular to the axial directions of the attachment hole 18, that is, toward the outer circumferential surface of the wristwatch case 1.

Also, the slit hole 25 is open in the surface of the one end portion 15*a* of the attachment piece 15 opposing a portion of the outer circumferential surface of the wristwatch case 1 between the pair of attachment projection sections 3*a* of the band attachment section 3 of the wristwatch case 1, as shown in FIG. 3, and FIG. 5A to FIG. 7. As a result, this slit hole 25 is structured to be covered by the outer circumferential surface of the wristwatch case 1 when the attachment piece 15 is arranged between the pair of attachment projection sections 3*a* of the band attachment section 3 of the wristwatch case 1.

In the one end portion 15*a* of the attachment piece 15, a pair of cutout sections 26 is provided in which the pair of lever sections 23 of the connection member 16 is rotated centering on the central axis of the attachment hole 18 and arranged to be movable in the axial directions of the attachment hole 18, as shown in FIG. 5A to FIG. 7. More specifically, these cutout sections 26 include first cutout sections 26*a* in which the pair of lever sections 23 is rotated centering on the central axis of the attachment hole 18, and second cutout sections 26*b* in which the rotated lever sections 23 are arranged to be movable in the axial directions of the attachment hole 18.

In this embodiment, the first cutout sections 26*a* are formed between the above-described surface of the one end portion 15*a* of the attachment piece 15 opposing the portion of the outer circumferential surface of the wristwatch case corresponding to the slit hole 25 and the inner circumferential surface of the attachment hole 18, as shown in FIG. 5A to FIG. 7. The second cutout sections 26*b* are formed between the undersurface of the attachment piece 15 and the inner circumferential surface of the attachment hole 18, and open toward the undersurface side of the attachment piece 15, that is, the back surface side of the wristwatch case 1. As a result of this structure, when rotated in the pair of first cutout sections 26*a* while centering on the central axis of the attachment hole 18 and arranged in the pair of second cutout sections 26*b*, the pair of lever sections 23 is exposed toward the undersurface side of the attachment piece 15, that is, the undersurface side of the wristwatch case 1.

Also, each of the pair of cutout sections 26 is formed such that its length in the axial directions of the attachment hole 18 is longer than the axial length of each projection section 22*b* of the pair of slide sections 22 and shorter than the axial length of each opening section 24 provided in the side portions of the pipe section 20, as shown in FIG. 5A to FIG. 7. Accordingly, when arranged in the pair of cutout sections 26, the pair of lever sections 23 is movable in the axial directions of the attachment hole 18 only within the ranges of the pair of cutout section 26. As a result of this structure, the pipe section 20 is not slipped out from the attachment hole 18 of the attachment piece 15.

In this embodiment, the second cutout sections 26*b* of the pair of cutout sections 26 are formed such that the pair of lever sections 23 is moved toward and approaches the pair of attachment projection sections 3*a* of the band attachment section 3 as shown in FIG. 2 when the pair of slide sections 22 is pressed toward the outside of the pipe section 20 by the spring force of the spring member 21, as shown in FIG. 5A to FIG. 7.

Also, the second cutout sections 26*b* of the pair of cutout sections 26 are formed such that the pair of lever sections 23 is moved away from the pair of attachment projection sections 3*a* of the band attachment section 3 and approaches the inner ends of the second cutout sections 26*b* in the middle of the pipe section 20 in the axial directions when the projection sections 22*b* of the pair of slide sections 22 are pressed into the pipe section 20 against the spring force of the spring member 21, as shown in FIG. 5A to FIG. 7.

Also, on the one end portion 15*a* of the attachment piece 15, an engaging section 28 which engages with a corresponding locking section 27 on the wristwatch case 1 is provided, as shown in FIG. 3 to FIG. 7. This engaging section 28 includes a cutout recess section 28*a* which is formed in the upper part of the above-described opposing surface of the one end portion 15*a* of the attachment piece 15 and is open toward this opposing surface and the upper surface of the attachment piece 15, and an engaging projection section 28*b* which is formed on the bottom surface of the cutout recess section 28*a* and has a substantially chevron shape.

The above-described locking section 27 of the wristwatch case 1 includes a locking projection section 27*a* which is formed on an outer circumferential portion of the wristwatch case 1 between the pair of attachment projection sections 3*a* of the band attachment section 3 and arranged in the cutout recess section 28*a* of the engaging section 28 of the attachment piece 15, and a locking recess section 27*b* having a substantially chevron shape which is formed in the undersurface of the locking projection section 27*a* and with which the engaging projection section 28*b* of the engaging section 28 of the attachment piece 15 is engaged, as shown in FIG. 3 to FIG. 7.

As a result of this structure, when the attachment piece 15 is arranged between the pair of attachment projection sections 3*a* of the band attachment section 3, the locking projection section 27*a* of the locking section 27 provided on the band attachment section 3 of the wristwatch case 1 is arranged in the cutout recess section 28*a* of the engaging section 28 provided in the attachment piece 15, and the substantially chevron-shaped engaging projection section 28*b* of the engaging section 28 engages with the substantially chevron-shaped locking recess section 27*b* of the locking section 27, whereby the attachment piece 15 does not rattle with respect to the wristwatch case 1, as shown in FIG. 3.

The attachment piece 15 is formed of a sintered metal acquired by the metal powder of stainless steel, titanium alloy, or the like being sintered. More specifically, the attachment piece 15 is formed by the metal powder of stainless steel, titanium alloy, or the like being mixed into a fluid resin by Metal Injection Molding (MIM), injected to fill a molding die, and subjected to sintering processing in this state to evaporate the resin and sinter the metal powder. As a result, the attachment piece 15 has a high strength.

Next, the attachment of each watch band 2 to the wristwatch case 1 of the wristwatch is described.

Before this attachment, the wristwatch case 1 is assembled in advance. In this assembly, first, the parting members 9 are attached in the upper case 6, and then the watch glass 8 is attached to the upper opening of the upper case 6 together with the packing 8*a*. Subsequently, in this state, the upper case 6 and the waterproof ring 6*a* are arranged on the upper part of the lower case 5.

Next, the first decorative case 7*a* of the exterior case 7 is arranged on the upper outer circumferential portion of the upper case 6, and the second decorative case 7*b* of the exterior case 7 is arranged on the upper part of the first decorative case 7*a*. Then, in this state, the lower case 5, the upper case 6, the first decorative case 7*a* of the exterior case 7, and the second decorative case 7*b* of the exterior case 7 are attached to one another by the plurality of screws 6*b*, whereby the assembly of the wristwatch case 1 is completed.

Next, in this state, the timepiece module 11 is mounted in the wristwatch case 1, and the push button switches 4 are attached to the outer circumferential portions of the lower case 5 of the wristwatch case 1. Subsequently, the back cover 10 is attached to the lower part of the lower case 5 of the wristwatch case 1 together with the waterproof ring 10*a*, whereby the assembly of the wristwatch is completed. Then, the band main body 12 of each watch band 2 is assembled. In this assembly, the metal band pieces 12*a* are sequentially connected to one another.

Then, in this state, each watch band 2 is attached to the wristwatch case 1 by the corresponding connector 13. In this attachment, first, the corresponding connection member 16 is attached to the attachment piece 15 of this connector 13. Here, before this attachment, the attachment piece 15 is molded in advance. More specifically, the metal powder of stainless steel, titanium alloy, or the like is mixed into a fluid resin by Metal Injection Molding (MIM), injected to fill a molding die, and subjected to sintering processing in this state to evaporate the resin and sinter the metal powder. As a result, the attachment piece 15 having a high strength is molded.

The one end portion 15*a* of the attachment piece 15 molded as described above has formed therein the attachment hole 18, the slit hole 25, the pair of cutout sections 26, and the engaging section 28, and the other end portion 15*b* has formed therein the pin attachment hole 17. Also, the connection member 16 is assembled. In this assembly, the corresponding lever sections 23 are attached to the slide main bodies 22*a* of the pair of slide sections 22. Here, the shaft sections 23*b* of the lever sections 23 are attached to the shaft attachment holes 22*c* of the slide main bodies 22*a* by welding, screws, or the like.

Subsequently, the corresponding spring member 21 is inserted into the pipe section 20 of the connection member 16, and the slide main bodies 22*a* of the slide sections 22 are inserted into the pipe section 20 through its sides. Here, the lever sections 23 provided on the slide sections 22 are arranged in the opening sections 24 provided in the end portions of the pipe section 20 and, in this state, the ends of the pipe section 20 are swaged to form the stopper sections 20*a* thereon. As a result, the slide sections 22 are attached in a manner not to be slipped out from the pipe section 20, whereby the assembly of the connection member 16 is completed.

Then, the connection member 16 in this state is attached to the attachment piece 15. In this attachment, the pipe section 20 of the connection member 16 is inserted into the attachment hole 18 of the attachment piece 15, and the shaft sections 23*b* of the pair of lever sections 23 are inserted into the slit hole 25. Here, the pipe section 20 is inserted through one of the ends of the attachment hole 18.

When the pipe section 20 is started to be inserted into the attachment hole 18 through one end of the attachment hole 18, the shaft section 23*b* of one of the pair of lever sections 23 on the insertion side is inserted into the slit hole 25. Then, when the pipe section 20 approaches the other end of the attachment hole 18, the other lever section 23 approaches the above-described one end of the attachment hole 18. Then, when the pipe section 20 is further pressed into the attachment hole 18 in this state, the shaft section 23*b* of this other lever section 23 is inserted into the slit hole 25, so that both lever sections 23 are in the slit hole 25.

Here, the pair of lever sections 23 is arranged corresponding to the pair of cutout sections 26 of the attachment piece 15. Subsequently, in this state, the pair of lever sections 23 is rotated centering on the central axis of the attachment hole 18. That is, the pair of lever sections 23 is rotated centering on the central axis of the attachment hole 18, in the first cutout sections 26*a* of the pair of cutout sections 26. As a result, the pair of lever sections 23 is arranged in the second cutout sections 26*b* of the pair of cutout section 26 in a manner to be movable in the axial directions of the attachment hole 18.

In this state, the movements of the pair of lever sections 23 in the axial directions of the attachment hole 18 can only be made within the ranges of the second cutout sections 26*b* of the pair of cutout sections 26. Therefore, the pipe section 20 is not slipped out from the attachment hole 18 of the attachment piece 15. Also, in this state, the pair of lever sections 23 has been arranged and exposed on the undersurface side of the attachment piece 15 such that the pipe section 20 is not slipped out in directions perpendicular to the axial directions of the attachment hole 18 through the slit hole 25. By this procedure, the connection member 16 is attached to the attachment piece 15.

Then, the attachment piece 15 of this connector 13 is attached to the corresponding band main body 12. In this attachment, the other end portion 15*b* of the attachment piece 15 is arranged in the recess section 12*b* of a band piece 12*a* at an end of the band main body 12 such that the pin attachment hole 17 of the attachment piece 15 coaxially corresponds to the pin insertion holes 12*c* provided in the side portions of the recess section 12*b* of the band piece 12*a*.

Subsequently, in this state, the corresponding pin component 14 is inserted into the pin attachment hole 17 of the attachment piece 15 through one of the pin insertion holes 12*c* in the side portions of the recess section 12*b* of the band piece 12*a*, and then inserted into the other one of the pin insertion holes 12*c* in the side portions of the recess section 12*b* of the band piece 12*a*. As a result, the attachment piece 15 is attached to the band piece 12*a* at the end of the band main body 12, whereby the assembly of this watch band 2 is completed.

When this watch band 2 is to be attached to the corresponding band attachment section 3 of the wristwatch case 1, the pair of lever sections 23 of the connection member 16 attached to the attachment piece 15 is moved in directions to approach each other against the spring force of the spring member 21, whereby the projection sections 22*b* of the pair of slide sections 22 are pulled into the pipe section 20.

Then, in this state, the attachment piece 15 is arranged between the pair of attachment projection sections 3*a* of the band attachment section 3, and the engaging section 28 of the attachment piece 15 is engaged with the locking section 27 on the band attachment section 3 of the wristwatch case 1 such that the projection sections 22*b* of the pair of slide sections 22 correspond to the pin connection holes 3*b* provided in the pair of attachment projection sections 3*a*.

In this embodiment, when the engaging section 28 of the attachment piece 15 is engaged with the locking section 27 provided on the band attachment section 3 of the wristwatch case 1, the locking projection section 27*a* of the locking section 27 provided on the band attachment section 3 of the wristwatch case 1 is arranged in the cutout recess section 28*a* of the engaging section 28 provided in the attachment piece 15, and the substantially chevron-shaped engaging projection section 28*b* of the engaging section 28 engages with the substantially chevron-shaped locking recess section 27*b* of the locking section 27, whereby the attachment piece 15 is prevented from rattling with respect to the wristwatch case 1.

In addition, when the projection sections 22*b* of the pair of slide sections 22 are positioned corresponding to the pin connection holes 3*b* provided in the pair of attachment projection sections 3*a*, the pair of slide sections 22 is slid in directions to be pushed outside the pipe section 20 by the spring force of the spring member 21, and the projection sections 22*b* of the pair of slide sections 22 are inserted into the pin connection holes 3*b* of the pair of attachment projection sections 3*a*. As a result, the attachment piece 15 is attached to the band attachment section 3 by the connection member 16, whereby the watch band 2 is attached to the band attachment section 3 of the wristwatch case 1.

In this state, the slit hole 25 of the attachment piece 15 has been covered by an outer circumferential portion of the wristwatch case 1 located between the pair of attachment projection sections 3*a*. Therefore, even though the slit hole 25 has been formed in the attachment piece 15 over the entire length of the attachment hole 18 from the one end of the attachment hole 18 to the other end, this slit hole 25 is not seen from outside the wristwatch case 1, which enhances the external appearance and the design.

Also, in this state, the pair of lever sections 23 has been arranged in the second cutout sections 26*b* of the pair of cutout sections 26 in the attachment piece 15 in a manner to be movable in the axial directions of the attachment hole 18, and exposed on the undersurface side of the attachment piece 15, that is, the undersurface side of the wristwatch case 1. Accordingly, in the state where the watch band 2 has been attached to the band attachment section 3, the pair of lever sections 23 can be moved in the axial directions of the attachment hole 18 within the ranges of the second cutout sections 26*b* of the pair of cutout sections 26.

Next, the detachment of this watch band 2 from the band attachment section 3 of the wristwatch case 1 is described.

In this detachment, the pair of lever sections 23 arranged in the second cutout section 26*b* of the pair of cutout sections 26 in the attachment piece 15 is moved in the directions to approach each other against the spring force of the spring member 21.

As a result, the slide main bodies 22*a* of the pair of slide sections 22 are slid toward the inner side of the pipe section 20, and the projection sections 22*b* of the pair of slide sections 22 are shifted out of the pin connection holes 3*b* in the pair of attachment projection sections 3*a* of the band attachment section 3 of the wristwatch case 1 and moved into the pipe section 20. Consequently, the attachment piece 15 can be easily detached from the area between the pair of attachment projection sections 3*a* of the band attachment section 3, whereby the watch band 2 can be easily detached from the band attachment section 3 of the wristwatch case 1.

Also, when the connection member 16 is to be detached from the attachment piece 15, the pair of lever sections 23 arranged in the second cutout sections 26*b* of the pair of cutout sections 26 in the attachment piece 15 are rotated so as to be arranged in the slit hole 25 of the pipe section 20. Here, the pair of lever sections 23 is rotated centering on the central axis of the attachment hole 18, in the first cutout sections 26*a* of the pair of cutout sections 26.

As a result, the shaft sections 23*b* of the pair of lever sections 23 are arranged in the slit hole 25 of the pipe section 20. Then, in this state, the pipe section 20 is drawn out of the attachment hole 18 of the attachment piece 15. Here, the shaft sections 23*b* of the pair of lever sections 23 are moved in the slit hole 25 of the attachment piece 20, so that the pipe section 20 can be easily drawn out of the attachment hole 18 of the attachment piece 15.

As described above, each connector 13 of this wristwatch includes the attachment piece 15 which is an attachment member having the attachment hole 18 and is attached to the corresponding band main body 12 serving as a connection object, and the connection member 16 where the slide sections 22 which are slid in the cylindrical pipe section 20 inserted into the attachment hole 18 include the lever sections 23 and are retractably protrude from the ends of the pipe section 20 so as to be attached to the wristwatch case 1 serving as a connection target. In the attachment piece 15, the slit hole 25 into which the lever sections 23 are slidably inserted are formed extending from one end of the attachment hole 18 to the other end, whereby the connection member 16 can be easily attached to or detached from the attachment piece 15.

That is, in each connector 13 of this wristwatch, the slit hole 25 into which the lever sections 23 are slidably inserted is formed in the attachment piece 15 while extending from one end of the attachment hole 18 to the other end. As a result of this structure, when the pipe section 20 of the connection member 16 is inserted into the attachment hole 18 of the attachment piece 15, the lever sections 23 are inserted into and moved in the slit hole 25 of the attachment piece 15, whereby the connection member 16 can be easily attached to the attachment piece 15. In addition, by this structure, the connection member 16 can be easily detached from the attachment piece 15, whereby band replacement can be easily performed.

Also, in each connector 13, by the slit hole 25 being formed in the attachment piece 15 while extending from one end of the attachment hole 18 to the other end, the pipe section 20 of the connection member 16 can be inserted into the attachment hole 18 of the attachment piece 15 through either end of the attachment hole 18. By this structure as well, the connection member 16 can be easily attached to or detached from the attachment piece 15

In this embodiment, in each connector 13, the slide sections 22 which are arranged in the end portions of the pipe section 20 have the lever sections 23 provided thereon. Accordingly, the slide sections 22 arranged in the end portions of the pipe section 20 can be slid in the pipe section 20 by the lever sections 23 being moved in the axial directions of the attachment hole 18. As a result of this structure, operability when the slide sections 22 are slid can be improved, whereby band replacement can be easily performed.

In the case of this connector 13, even though the lever sections 23 have been provided on the slide sections 22 arranged in the end portions of the pipe section 20, the pipe section 20 of the connection member 16 can be inserted into the attachment hole 18 of the attachment piece 15 through either end of the attachment hole 18 and the lever sections 23 can be inserted through either end of the slit hole 25 since the slit hole 25 has been formed in the attachment piece 15 while extending from one end of the attachment hole 18 to the other end.

Also, in the case of this connector 13, the slit hole 25 of the attachment piece 15 is covered by the wristwatch case 1. Therefore, even though the slit hole 25 is formed in the attachment piece 15 while extending from one end of the attachment hole 18 to the other end, when the connector 13 is attached to the corresponding band attachment section 3 of the wristwatch case 1, the slit hole 25 can be hidden by the wristwatch case 1 so as not to be seen from outside, which enhances the external appearance and the design Moreover, in the case of this connector 13, the attachment piece 15 has formed therein the cutout sections 26 in which the lever sections 23 of the connection member 16 are rotated centering on the central axis of the attachment hole 18 and arranged in a manner to be slidable in the axial directions of the attachment hole 18, whereby the lever sections 23 are slid only within the ranges of the cutout sections 26. As a result of this structure, the pipe section 20 can be prevented from being slipped out from the attachment hole 18 of the attachment piece 15.

That is, the cutout sections 26 of this connector 13 include the first cutout sections 26*a* in which the lever sections 23 are rotated centering on the central axis of the attachment hole 18, and the second cutout sections 26*b* in which the rotated lever sections 23 are arranged to be movable in the axial directions of the attachment hole 18, whereby the lever sections 23 are rotated in the first cutout sections 26*a* while centering on the central axis of the attachment hole 18, and arranged in a manner to be movable in the axial directions of the attachment hole 18 within the ranges of the second cutout sections 26*b*. As a result of this structure, the pipe section 20 can be prevented from being slipped out from the attachment hole 18 of the attachment piece 15.

Furthermore, in the case of this connector 13, by being arranged in the cutout sections 26 of the attachment piece 15 and exposed toward the undersurface side, that is, the back surface side of the wristwatch case 1, the lever sections 23 in the cutout sections 26 can be moved in the axial directions of the attachment hole 18 even when the slit hole 25 of the attachment piece 15 is covered by the wristwatch case 1. As a result of this structure, the attachment piece 15 can be easily detached from the band attachment section 3 of the wristwatch case 1, whereby band replacement can be easily performed.

Still further, in the case of this connector 13, the attachment piece 15 includes the engaging section 28 which engages with the corresponding locking section 27 of the wristwatch case 1. Accordingly, when the attachment piece 15 is arranged between the pair of attachment projection sections 3*a* of the band attachment section 3, the engaging section 28 of the attachment piece 15 engages with the locking section 27 provided on the band attachment section 3 of the wristwatch case 1, whereby the attachment piece 15 is reliably prevented from rattling with respect to the wristwatch case 1.

That is, in the case of this connector 13, when the engaging section 28 of the attachment piece 15 is engaged with the locking section 27 provided on the band attachment section 3 of the wristwatch case 1, the locking projection section 27*a* of the locking section 27 provided on the band attachment section 3 of the wristwatch case 1 is arranged in the cutout recess section 28*a* of the engaging section 28 provided in the attachment piece 15, and the substantially chevron-shaped engaging projection section 28*b* of the engaging section 28 engages with the substantially chevron-shaped locking recess section 27*b* of the locking section 27, whereby the attachment piece 15 is reliably prevented from rattling with respect to the wristwatch case 1.

Yet still further, in the case of this connector 13, the attachment piece 15 is formed of a sintered metal acquired by the metal powder of stainless steel, titanium alloy, or the like being sintered, and thereby has a high strength. More specifically, the attachment piece 15 is formed by the metal powder of stainless steel, titanium alloy, or the like being mixed into a fluid resin by Metal Injection Molding (MIM), injected to fill a molding die, and subjected to sintering processing in this state to evaporate the resin and sinter the metal powder. Accordingly, even though the shape of the attachment piece 15 is complicated, the attachment piece 15 can be easily manufactured.

In the above-described embodiment, in each connection member 16, the lever sections 23 are provided on the pair of slide sections 22 in the end portions of the pipe section 20. However, the present invention is not limited thereto. For example, a structure may be adopted in which only one of the pair of slide sections 22 has a lever section 23 provided thereon.

Also, in the above-described embodiment, the slit hole 25 and the cutout sections 26 are formed in each attachment piece 15. However, in the present invention, the cutout sections 26 are not necessarily required to be formed, and a structure may be adopted in which only the slit hole 25 is formed in each attachment piece 15. In this structure, the slit hole 25 is formed to be open and exposed toward the undersurface side of the attachment piece 15 corresponding to the back surface side of wristwatch case 1, and is not hidden by the outer circumferential surface of the wristwatch case 1.

Moreover, in the above-described embodiment, the engaging sections 28 are formed in the attachment pieces 15, and the locking sections 27 are formed on the band attachment sections 3 of the wristwatch case 1. However, the present invention is not limited thereto. For example, a structure may be adopted in which the locking sections 27 are formed on the attachment pieces 15, and the engaging sections 28 are formed in the band attachment sections 3 of the wristwatch case 1.

Furthermore, in the case of the above-described embodiment, the attachment pieces 15 are formed of a sintered metal acquired by metal powder being sintered. However, the present invention is not limited thereto. For example, the attachment pieces 15 may be formed of synthetic resin.

Still further, in the above-described embodiment, each attachment piece 15 is attached to a band piece 12*a* at an end of the corresponding band main body 12, and attached to the corresponding band attachment section 3 of the wristwatch case 1 by the corresponding connection member 16. However, the present invention is not limited thereto. For example, a structure may be adopted in which each attachment piece 15 is provided on the corresponding band attachment section 3 of the wristwatch case 1, and attached to a band piece 12*a* at an end of the corresponding band main body 12 by the corresponding connection member 16.

Figure 9:
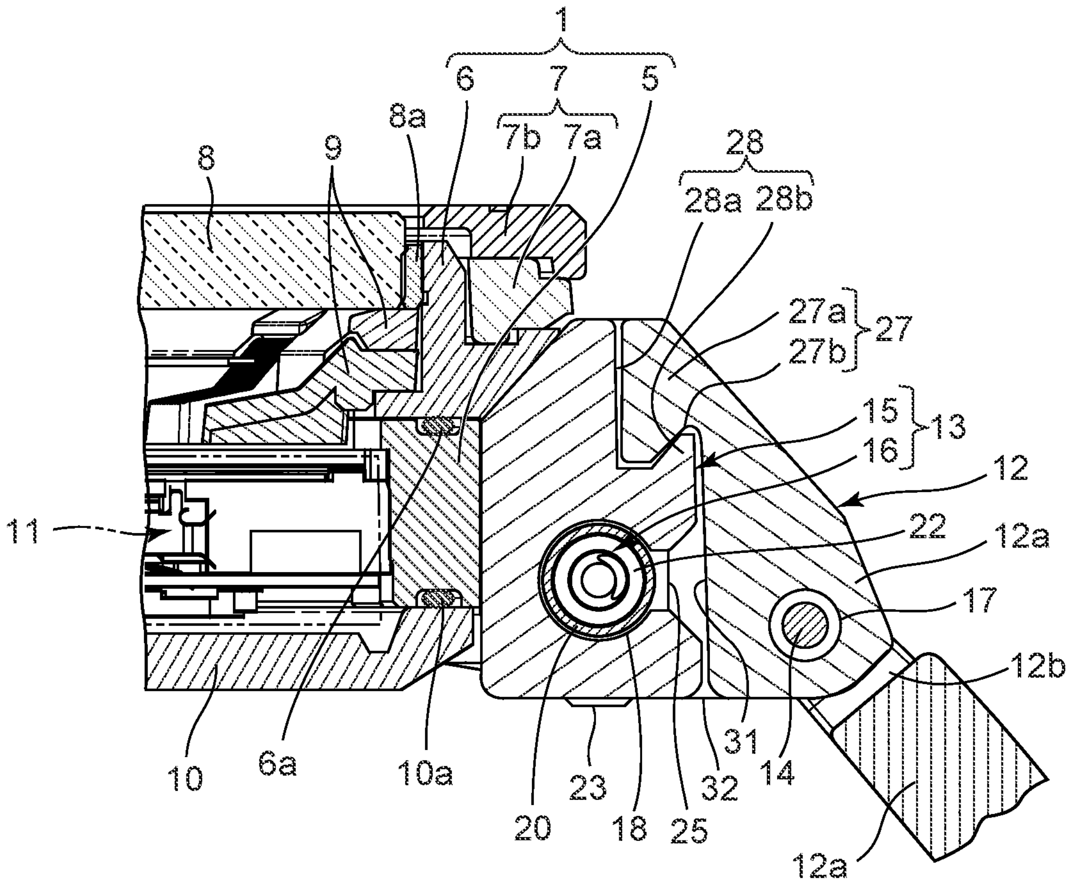
FIG. 9 is a diagram corresponding to FIG. 3, in which another embodiment is shown.

FIG. 9 is a diagram corresponding to FIG. 3, in which another embodiment having this structure is shown. In this embodiment, the attachment piece 15 constituting the connector 13 is provided on the band attachment section 3 of the wristwatch case 1 that is a connection target, and the connection member 16 is attached to this attachment piece 15. Also, the band piece 12*a* at the end of band main body 12 in this embodiment is different from that in the above-described embodiment and is provided with a recess section 31 which houses the attachment piece 15 and a pair of arm sections 32 which constitutes side parts of the recess section 31. In the inner surfaces of the arm sections 32 opposing each other, pin connection holes (not shown) are provided into which the projection sections 22*b* of the pair of slide sections 22 of the connection member 16 are inserted. In addition, in the attachment piece 15, the engaging section 28 is provided which engages with the locking section 27 provided on the band piece 12*a* at the end of the band main body 12. Note that the other sections that are the same as those of FIG. 3 are given the same reference numerals and descriptions thereof are omitted.

In this embodiment as well, when each watch band 2 is to be attached to the corresponding band attachment section 3 of the wristwatch case 1, first, the connection member 16 is attached to the attachment piece 15, and the pair of lever sections 23 is arranged to be exposed toward the undersurface side of the attachment piece 15. Subsequently, the lever sections 23 are moved in the directions to approach each other so that the projection sections 22*b* of the pair of slide sections 22 are pressed into the pipe section 20. Then, in this state, the locking section 27 provided on the band piece 12*a* at the end of the band main body 12 is engaged with the engaging section 28 provided in the attachment piece 15, and the projection sections 22*b* of the pair of slide sections 22 are inserted into the pin connection holes provided in the pair of arm sections 32 of the band piece 12*a* at the end of the band main body 12. As a result, by the connection member 16, the attachment piece 15 is attached to the band piece 12*a* at the end of the band main body 12. Consequently, each watch band 2 is attached to the corresponding band attachment section 3 of the wristwatch case 1. Note that, by the reverse procedure, each watch band 2 can be detached from the corresponding band attachment section 3 of the wristwatch case 1.

In the connector 13 of FIG. 9 as well, the connection member 16 can be easily attached to or detached from the attachment piece 15. That is, by this connector 13 as well, band replacement can be easily performed. Also, by the structure where the engaging section 28 which engages with the locking section 27 provided on the band piece 12*a* at the end of the band main body 12 is provided in the attachment piece 15, the band piece 12*a* at the end of the band main body 12 can be reliably prevented from rattling with respect to the attachment piece 15.

In the above-described embodiments, the present invention has been applied in a wristwatch. However, the present invention is not necessarily required to be applied in a wristwatch. For example, the present invention is applicable to bands for clothes, briefcases, and handbags.

While the present invention has been described with reference to the preferred embodiments, it is intended that the invention be not limited by any of the details of the description therein but includes all the embodiments which fall within the scope of the appended claims.

What is claimed is:

1. A connector comprising:

an attachment member which has an attachment hole and is provided on one of a connection object and a connection target; and a connection member which (i) includes a slide member that has a lever and is slidable in a cylindrical member inserted into the attachment hole, and (ii) is attached to an other one of the connection object and the connection target by the slide member protruding from an end of the cylindrical member, wherein the attachment member has a slit hole which is formed extending from one end of the attachment hole to an other end of the attachment hole and in which the lever is slidable, wherein the attachment member has formed therein a cutout portion in which the lever of the connection member is rotated centering on a central axis of the attachment hole and arranged in a manner to be rotatable in an axial direction of the attachment hole, and wherein the cutout portion is formed such that a length in the axial direction of the attachment hole is longer than an axial length of a portion of the slide member which protrudes from the cylindrical member and shorter than an axial length of an opening formed in an end portion of the cylindrical member.

2. The connector according to claim 1, wherein the slide member is plurally arranged in end portions of the cylindrical member, and the lever is provided on each slide member.

3. The connector according to claim 2, wherein the slit hole of the attachment member is covered by the other one of the connection object and the connection target.

4. The connector according to claim 2, wherein the lever is arranged in the cutout portion of the attachment member and exposed on back surface sides of the connection object and the connection target.

5. The connector according to claim 1, wherein the slit hole of the attachment member is covered by the other one of the connection object and the connection target.

6. The connector according to claim 5, wherein the lever is arranged in the cutout portion of the attachment member and exposed on back surface sides of the connection object and the connection target.

7. The connector according to claim 1, wherein the lever is arranged in the cutout portion of the attachment member and exposed on back surface sides of the connection object and the connection target.

8. The connector according to claim 1, wherein the attachment member has an engaging portion which engages with a locking portion formed on the other one of the connection object and the connection target.

9. The connector according to claim 1, wherein the attachment member is formed of a sintering metal acquired by metal powder being sintered.

10. The connector according to claim 1, wherein the connection object is a band.

11. The connector according to claim 1, wherein the connection target is a timepiece.

* * * * *